A. H. REED.
ADJUSTABLE MOUNTING FOR TRACTOR CONTROLLING MECHANISM.
APPLICATION FILED MAR. 15, 1918.
1,305,932.
Patented June 3, 1919.
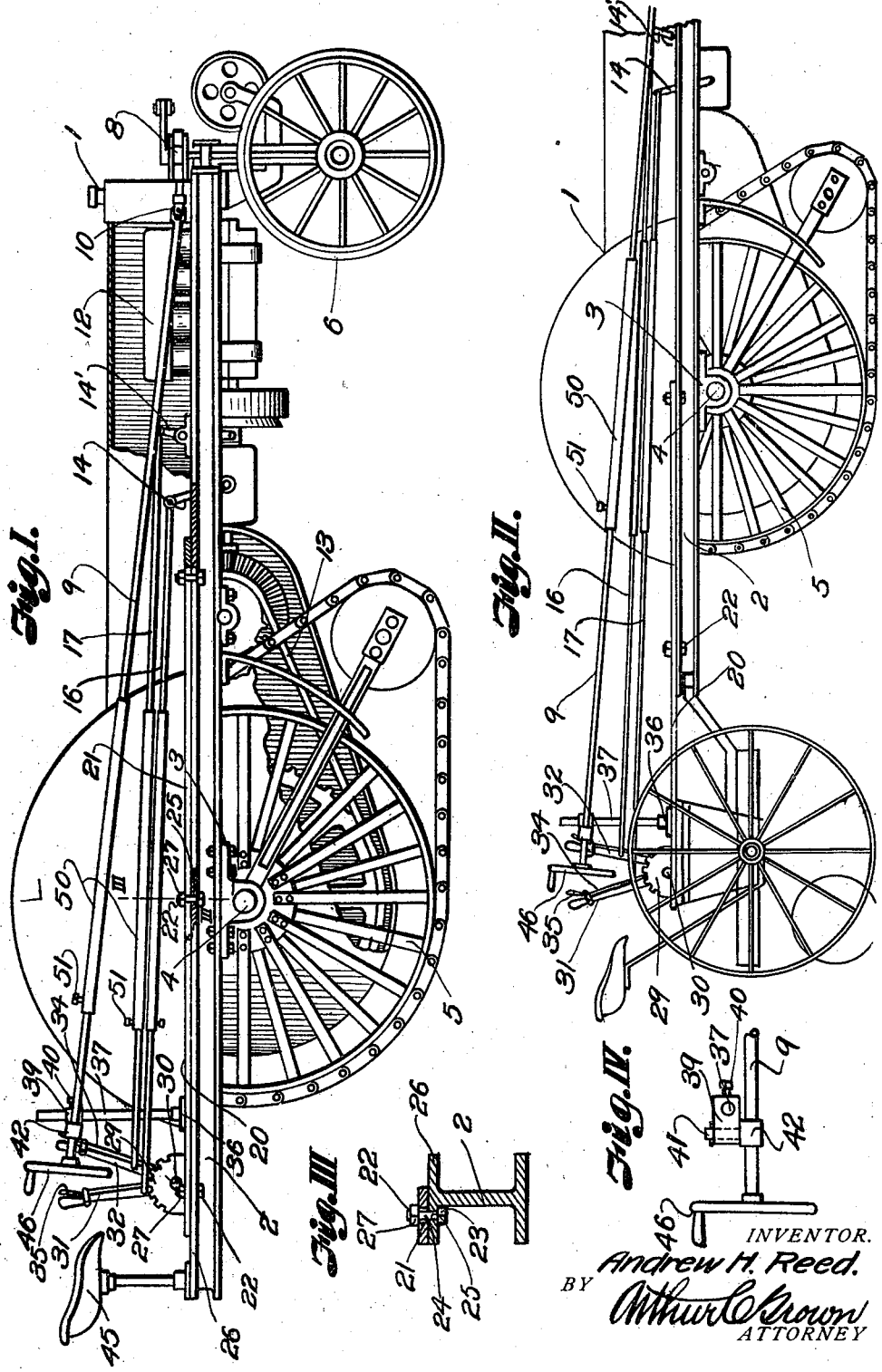
INVENTOR.
Andrew H. Reed.
BY Arthur C. Brown
ATTORNEY

UNITED STATES PATENT OFFICE.

ANDREW H. REED, OF KANSAS CITY, MISSOURI, ASSIGNOR OF ONE-HALF TO H. SAHLER, OF KANSAS CITY, MISSOURI.

ADJUSTABLE MOUNTING FOR TRACTOR-CONTROLLING MECHANISM.

1,305,932.                Specification of Letters Patent.       Patented June 3, 1919.

Original application filed April 11, 1917, Serial No. 161,156. Divided and this application filed March 15, 1918. Serial No. 222,696.

*To all whom it may concern:*

Be it known that I, ANDREW H. REED, a citizen of the United States, residing at Kansas City, in the county of Jackson and State of Missouri, have invented certain new and useful Improvements in Adjustable Mountings for Tractor-Controlling Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This application is a division of an application filed by me on or about April 11, 1917, Serial No. 161,156.

My invention relates to improvements in farm tractors and more particularly to adjustably mounted controlling mechanism; the principal object of the invention being to provide extensible steering and motor controlling parts, so mounted on the tractor frame, that they may be operated from the usual driver's position on the tractor, or may be extended rearwardly to such an adjusted position that the tractor may be steered and controlled from the seat of an implement being drawn thereby.

In accomplishing this object I have provided improved details of structure the preferred forms of which are illustrated in the accompanying drawings, wherein:—

Figure I is a side view of a tractor equipped with controlling mechanism constructed and mounted according to the present invention.

Fig. II is a similar view showing the parts in extended position.

Fig. III is a transverse sectional view on the line III—III Fig. I.

Fig. IV is a detail plan view illustrating the mounting of the steering shaft on its supporting standard.

Referring more in detail to the drawings:—

1 designates a farm tractor, of any ordinary type of construction, comprising longitudinally extending side rails 2, preferably of I-beam construction, whereto, at oppositely disposed points of the frame, bearings 3 are fixed, wherein a transverse shaft 4, which mounts drive or ground wheel 5 whereby the tractor is propelled, is supported.

At its forward end the tractor frame is supported by guide wheels 6, that are synchronously operated through suitable connecting means by the actuation of steering mechanism indicated at 8; the latter being operated under the control of a steering rod 9 extending rearwardly therefrom and flexibly connected to the said control mechanism by means of a universal coupling 10.

Supported by the side beams 2, forwardly of the ground wheels 5, is a motor 12 that is operatively connected by suitable gearing mechanism and a chain belt 13 with the drive wheels 5, and the motor is operated at the speed and in the direction desired under the control of lever arms 14—14' extending therefrom to the side of the frame above the side beam 2; the said levers being actuated by the manipulation of rearwardly extending rods 16—17 pivotally connected therewith at their forward ends and at the rearward ends pivotally fixed to actuating levers presently described.

Slidably mounted on the flat upper face of the side beam 2, and extending longitudinally therewith is a bar 20, provided with a longitudinally extending slot 21 wherethrough bolts 22 are extended; the said bolts having head portions 23 that overlie the bar at opposite sides of the slot, and shank portions 24 that extend through the slot and registering apertures 25 in the outer side of the rail flange 26 and carry nuts 27 which may be tightened on the shanks to draw the heads tightly against the bar to hold the latter at any longitudinally adjustable position on the side rail within the limits permitted by the length of the slot.

Mounted adjacent the rearward end of the bar 20 is a notched sector plate 29 whereon, by means of a bolt 30, the lever arms 31 and 32 to which the rearward ends of the motor control rods 16—17 are respectively attached, are mounted; the said lever arms each having a latch mechanism indicated by the rods 34 and pivoted hand grip 35 at the upper ends of the levers, whereby the levers may be locked to the sector plate, to hold the levers at a desired adjustment.

Also fixed to the bar, forwardly of the sector plate is an outwardly extending bracket 36 and mounted on the outer end thereof is a post 37 whereby the rearward end of the steering rod 9 is supported.

The means for supporting the steering rod from the post 37 comprises a bearing block 39, that is slidably mounted on the post and may be fixed at an adjusted position thereon by means of a set screw 40 threaded thereinto and adapted to engage the post. Pivotally supported by the bearing 39 by means of a shank 41 extending laterally therefrom and revolubly fixed in the bearing 39 is a secondary bearing 42 wherethrough the steering rod revolubly extends.

With this arrangement it is apparent that the bearing 37 may be adjusted along the post to hold the steering rod at a proper elevation, and horizontal movement of the forward end of the steering rod, incidental to travel of the tractor guide wheels over irregular ground, is permitted without binding in the bearing 42 because of its pivotal mounting by means of the shank 41.

Mounted at the rear of the tractor frame is a seat 45 and fixed to the end of the steering rod 9 is a wheel 46 which is held at such position by the rod, that a person in the seat may conveniently reach and actuate the wheel to steer the tractor and may also have access to the engine control levers 31 and 32.

In order that the steering rod 9 and engine control rods may be lengthened or shortened in accordance with the longitudinal shifting of the bar 20 on the frame rail 2 I divide the said rods into two sections each and telescope the adjacent ends of the sections within tubular sections 50; the said tubular section being fixed at one of their ends to the end of a rod extended thereinto and slidably containing the opposite sections which may be fixed at adjusted positions therein by means of set screws 51 threaded through the tubular sections and adapted to bear thereagainst.

With the parts so constructed it is apparent that when the tractor driver wishes to operate the tractor from the tractor seat the bar 20 which carries the steering and engine control parts is fixed at its forward position as shown in Fig. I, but should the operator attach a ground working or a planting machine to the tractor and desire to be in position to operate the said machine and also control the tractor he may, by loosening the bolts, free the slide bar 20 so that it may be moved rearwardly to support the tractor steering and controlling levers adjacent the seat of the drawn machine and he may operate both from the driver's seat on the latter.

By providing the telescoping features of the steering and engine control rods and the slidable mounting of the bar that supports the said rod control parts, it is apparent that the latter may be extended any desired distance within the limits of the bar and one man may then operate both machines, where without such features two men would be required.

Having thus described my invention what I claim as new therein and desire to secure by Letters-Patent, is:—

1. In a tractor, the combination with a frame member of a bar adjustably fixed to and bodily supported by said frame member, and tractor control devices mounted on said bar and movable therewith to an adjusted position in the rear of the tractor.

2. In a tractor, the combination with a frame member and guide wheels of a bar slidable on and bodily supported by said frame member for longitudinal adjustment therealong and adjustable steering mechanism mounted on said bar having operative connection with the said guide wheels.

3. In a tractor having front guide wheels, the combination with a longitudinal frame member of a bar slidable on and bodily supported by said frame member for longitudinal adjustment therealong, fastening device for fixing the bars to the frame in any adjusted position, steering members mounted on the rearward end of said bar and movable therewith into position operable from the tractor seat or from the seat of an implement drawn by the tractor and adjustable members operatively connecting said steering member with said guide wheels.

4. In a tractor having a longitudinally extending frame member, a slotted flat bar bodily resting upon said frame member and movable therealong, tractor control devices mounted on said bar and anchor members fixed in said frame member and extending through said bar slot to fix said bar to the frame member at an adjusted position.

5. In a tractor having guide wheels and a longitudinally extending frame member, a bar having a longitudinally extending slot therein mounted on said frame member and longitudinally adjustable therealong, steering mechanism mounted at the rearward end of said bar, adjustable means operatively connecting said guide wheels and steering mechanism and anchor members, fixed in said frame member and extended through said bar slot to adjustably fix the said bar to said frame member for the purpose set forth.

6. In a tractor having front guide wheels, a motor and a longitudinally extending side frame member, a bar mounted on said side member having a longitudinally extending slot therein, control members mounted on the rearward end of said bar, adjustable members operatively connecting said control members with said guide wheels and motor, and anchor members fixed in said side frame member and extending through said bar slot adapted to be tightened against said bar to retain the latter at a longitudinally adjusted position relative to the rear of the tractor frame for the purpose set forth.

7. In a tractor having front guide wheels, a motor, and a longitudinally extending side frame member, a bar mounted on said side member, adjustable longitudinally thereon and having a longitudinally extending slot therein, guide wheel and motor control members mounted on the rearward end of said bar and movable therewith to adjusted distances rearwardly of the frame member, telescoping connecting devices operatively connecting said control members with said guide wheels and motor and bolts fixed in said side frame members and extending through said bar slot to slidably retain the bar on the frame member and having heads adapted to be tightened against said bar to lock the same at an adjusted position.

8. In a tractor comprising a frame having a longitudinal extending side member, a motor supported by said frame having control levers extending therefrom and having front guide wheels, a bar mounted on the frame side member, longitudinally adjustable therealong, and having a longitudinally extending slot therein, telescoping connecting rods, operatively connecting said motor operating levers with the first named motor control levers, a telescoping rod operatively connected at its forward end with said guide wheels and pivotally supported at its opposite end from said post, and bolts fixed in said side frame members and extending through said bar slot to slidably retain the bar on the frame member and having heads adapted to be tightened against said bar to lock the same at an adjusted position.

In testimony whereof I affix my signature.

ANDREW H. REED.

Copies of this patent may be obtained for five cents each, by addressing the "Commissioner of Patents, Washington, D. C."